United States Patent
Daniels et al.

(10) Patent No.: US 7,305,530 B2
(45) Date of Patent: Dec. 4, 2007

(54) COPY OPERATIONS IN STORAGE NETWORKS

(75) Inventors: Rodger Daniels, Boise, ID (US); Lee Nelson, Boise, ID (US); Andrew Dallmann, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 267 days.

(21) Appl. No.: 10/979,716

(22) Filed: Nov. 2, 2004

(65) Prior Publication Data

US 2006/0095695 A1  May 4, 2006

(51) Int. Cl.
*G06F 12/00* (2006.01)

(52) U.S. Cl. .................. 711/162; 711/112; 711/147

(58) Field of Classification Search .................. 711/162
See application file for complete search history.

(56) References Cited

U.S. PATENT DOCUMENTS

| | | | |
|---|---|---|---|
| 5,471,631 A * | 11/1995 | Beardsley et al. .......... 713/502 |
| 6,594,745 B2 | 7/2003 | Grover | |
| 6,606,690 B2 | 8/2003 | Padovano | |
| 6,802,041 B1 * | 10/2004 | Rehm ...................... 715/500.1 |
| 6,912,631 B1 * | 6/2005 | Kekre et al. ................ 711/162 |
| 6,915,397 B2 * | 7/2005 | Lubbers et al. ............. 711/162 |
| 6,931,499 B2 * | 8/2005 | Delaney et al. ............. 711/154 |
| 7,107,418 B2 * | 9/2006 | Ohran ........................ 711/161 |
| 2002/0016827 A1 | 2/2002 | McCabe | |
| 2002/0103968 A1 | 8/2002 | Grover | |
| 2002/0104008 A1 | 8/2002 | Cochran | |
| 2002/0199073 A1 | 12/2002 | Tamura | |
| 2003/0074492 A1 | 4/2003 | Cochran | |
| 2003/0079092 A1 | 4/2003 | Cochran | |
| 2003/0079102 A1 * | 4/2003 | Lubbers et al. ............. 711/202 |
| 2003/0084241 A1 | 5/2003 | Lubbers | |
| 2003/0120676 A1 | 6/2003 | Holavanahalli | |
| 2003/0145179 A1 | 7/2003 | Gabber | |

* cited by examiner

*Primary Examiner*—Sanjiv Shah
*Assistant Examiner*—Daniel Tsui

(57) ABSTRACT

Exemplary storage network architectures, data architectures, and methods for creating and using snapdifference files in storage networks are described. One exemplary method may be implemented in a processor in a storage network. The method comprises receiving a request to execute a snapclone operation; generating, in response to the received service request, a snapclone copy of a source disk volume contemporaneous with the generation of the snapclone file, opening a first snapdifference file; and recording I/O operations to the source disk volume in the snapdifference file. The methods described herein may be embodied as logic instructions on a computer-readable medium.

17 Claims, 13 Drawing Sheets

COPY OPERATIONS IN STORAGE NETWORKS

TECHNICAL FIELD

The described subject matter relates to electronic computing, and more particularly to copy operations in storage networks.

BACKGROUND

The ability to duplicate and store the contents of a storage device is an important feature of a storage system. Data may be stored in parallel to safeguard against the failure of a single storage device or medium. Upon a failure of the first storage device or medium, the system may then retrieve a copy of the data contained in a second storage device or medium. The ability to duplicate and store the contents of the storage device also facilitates the creation of a fixed record of contents at the time of duplication. This feature allows users to recover a prior version of inadvertently edited or erased data.

There are space and processing costs associated with copying and storing the contents of a storage device. For example, some storage devices cannot accept input/output (I/O) operations while its contents are being copied. Furthermore, the storage space used to keep the copy cannot be used for other storage needs.

Storage-systems and storage software products can provide ways to make point-in-time copies of disk volumes. In some of these products, the copies may be made very quickly, without significantly disturbing applications using the disk volumes. In other products, the copies may be made space efficient by sharing storage instead of copying all the disk volume data.

However, known methodologies for copying data files include limitations. Some of the known disk copy methods do not provide fast copies. Other known disk copy methods solutions are not space-efficient. Still other known disk copy methods provide fast and space-efficient snapshots, but do not do so in a scaleable, distributed, table-driven virtual storage system.

Thus, there remains a need for improved copy operations in storage devices.

SUMMARY

In an exemplary implementation a method of computing may be implemented in a processor in a storage network. The method comprises receiving a request to execute a snapclone operation; generating, in response to the received service request, a snapclone copy of a source disk volume; contemporaneous with the generation of the snapclone file, opening a first snapdifference file; and recording I/O operations to the source disk volume in the snapdifference file.

DETAILED DESCRIPTION

Described herein are exemplary storage network architectures, data architectures, and methods for creating and using difference files in storage networks. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Exemplary Network Architectures

The subject matter described herein may be implemented in a storage architecture that provides virtualized data storage at a system level, such that virtualization is implemented within a SAN. In the implementations described herein, the computing systems that utilize storage are referred to as hosts. In a typical implementation, a host is any computing system that consumes data storage resources capacity on its own behalf, or on behalf of systems coupled to the host. For example, a host may be a supercomputer processing large databases, a transaction processing server maintaining transaction records, and the like. Alternatively, the host may be a file server on a local area network (LAN) or wide area network (WAN) that provides storage services for an enterprise.

In a direct-attached storage solution, such a host may include one or more disk controllers or RAID controllers configured to manage multiple directly attached disk drives. By contrast, in a SAN a host connects to the SAN in accordance via a high-speed connection technology such as, e.g., a fibre channel (FC) fabric in the particular examples.

A virtualized SAN architecture comprises a group of storage cells, where each storage cell comprises a pool of storage devices called a disk group. Each storage cell comprises parallel storage controllers coupled to the disk group. The storage controllers coupled to the storage devices using a fibre channel arbitrated loop connection, or through a network such as a fibre channel fabric or the like. The storage controllers may also be coupled to each other through point-to-point connections to enable them to cooperatively manage the presentation of storage capacity to computers using the storage capacity.

The network architectures described herein represent a distributed computing environment such as an enterprise computing system using a private SAN. However, the network architectures may be readily scaled upwardly or downwardly to meet the needs of a particular application.

Figure 1:
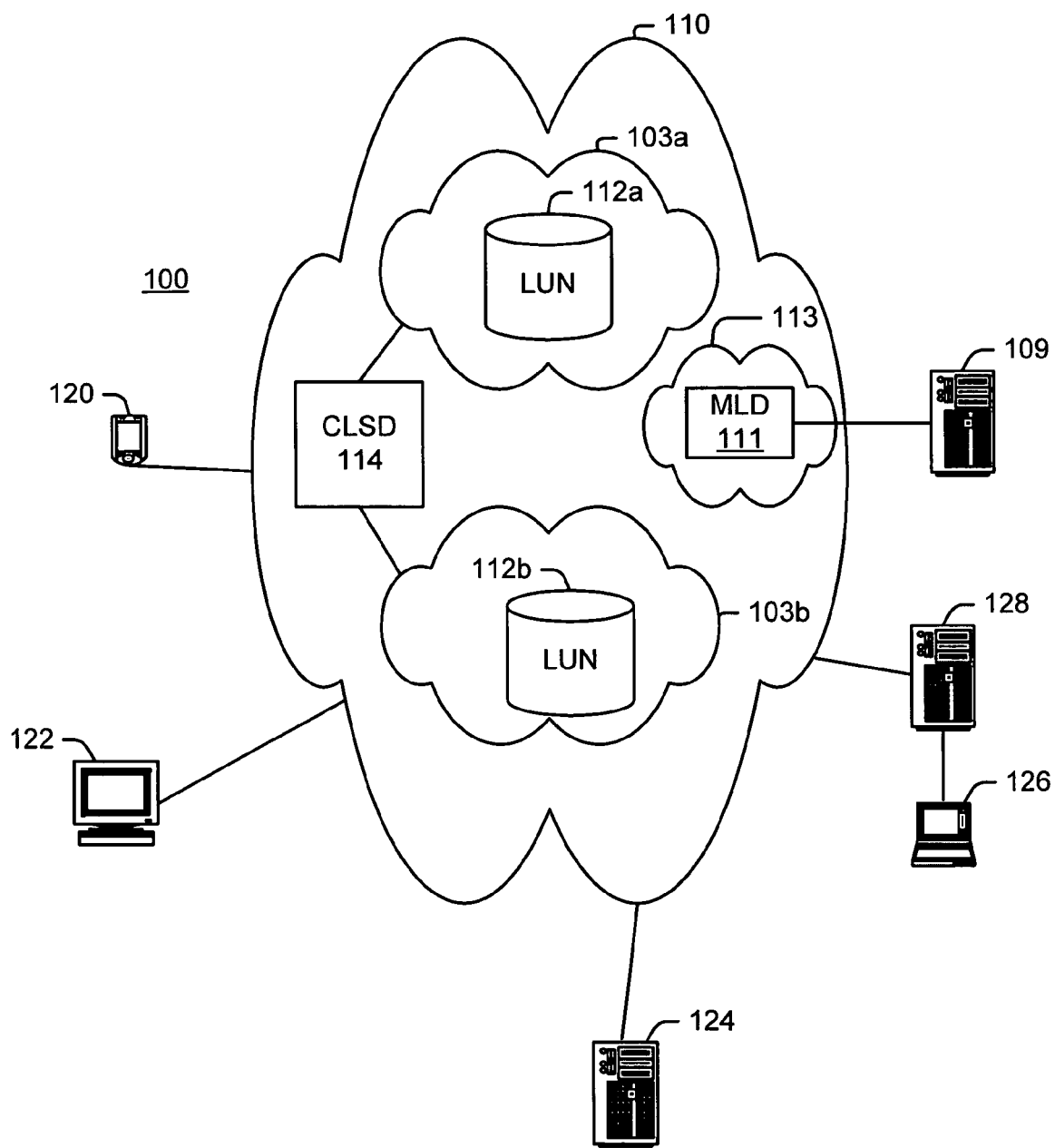
FIG. 1 is a schematic illustration of an exemplary implementation of a networked computing system that utilizes a storage network.

FIG. 1 is a schematic illustration of an exemplary implementation of a networked computing system 100 that utilizes a storage network. In one exemplary implementation, the storage pool 110 may be implemented as a virtualized storage pool as described in published U.S. patent application Publication No. 2003/0079102 to Lubbers, et al., the disclosure of which is incorporated herein by reference in its entirety.

A plurality of logical disks (also called logical units or LUNs) 112a, 112b may be allocated within storage pool 110. Each LUN 112a, 112b comprises a contiguous range of logical addresses that can be addressed by host devices 120, 122, 124 and 128 by mapping requests from the connection protocol used by the host device to the uniquely identified LUN 112a, 112b. A host such as server 128 may provide services to other computing or data processing systems or devices. For example, client computer 126 may access storage pool 110 via a host such as server 128. Server 128 may provide file services to client 126, and may provide other services such as transaction processing services, email services, etc. Hence, client device 126 may or may not directly use the storage consumed by host 128.

Devices such as wireless device 120, and computers 122, 124, which also may serve as hosts, may logically couple directly to LUNs 112a, 112b. Hosts 120-128 may couple to multiple LUNs 112a, 112b, and LUNs 112a, 112b may be shared among multiple hosts. Each of the devices shown in FIG. 1 may include memory, mass storage, and a degree of data processing capability sufficient to manage a network connection.

A LUN such as LUN 112a, 112b comprises one or more redundant stores (RStore) which are a fundamental unit of reliable storage. An RStore comprises an ordered set of physical storage segments (PSEGs) with associated redundancy properties and is contained entirely within a single redundant store set (RSS). By analogy to conventional storage systems, PSEGs are analogous to disk drives and each RSS is analogous to a RAID storage set comprising a plurality of drives.

The PSEGs that implements a particular LUN may be spread across any number of physical storage disks. Moreover, the physical storage capacity that a particular LUN 102 represents may be configured to implement a variety of storage types offering varying capacity, reliability and availability features. For example, some LUNs may represent striped, mirrored and/or parity-protected storage. Other LUNs may represent storage capacity that is configured without striping, redundancy or parity protection.

In an exemplary implementation an RSS comprises a subset of physical disks in a Logical Device Allocation Domain (LDAD), and may include from six to eleven physical drives (which can change dynamically). The physical drives may be of disparate capacities. Physical drives within an RSS may be assigned indices (e.g., 0, 1, 2, . . . , 11) for mapping purposes, and may be organized as pairs (i.e., adjacent odd and even indices) for RAID-1 purposes. One problem with large RAID volumes comprising many disks is that the odds of a disk failure increase significantly as more drives are added. A sixteen drive system, for example, will be twice as likely to experience a drive failure (or more critically two simultaneous drive failures), than would an eight drive system. Because data protection is spread within an RSS in accordance with the present invention, and not across multiple RSSs, a disk failure in one RSS has no effect on the availability of any other RSS. Hence, an RSS that implements data protection must suffer two drive failures within the RSS rather than two failures in the entire system. Because of the pairing in RAID-1 implementations, not only must two drives fail within a particular RSS, but a particular one of the drives within the RSS must be the second to fail (i.e. the second-to-fail drive must be paired with the first-to-fail drive). This atomization of storage sets into multiple RSSs where each RSS can be managed independently improves the performance, reliability, and availability of data throughout the system.

A SAN manager appliance 109 is coupled to a management logical disk set (MLD) 111 which is a metadata container describing the logical structures used to create LUNs 112a, 112b, LDADs 103a, 103b, and other logical structures used by the system. A portion of the physical storage capacity available in storage pool 101 is reserved as quorum space 113 and cannot be allocated to LDADs 103a, 103b, and hence cannot be used to implement LUNs 112a, 112b. In a particular example, each physical disk that participates in storage pool 110 has a reserved amount of capacity (e.g., the first "n" physical sectors) that may be designated as quorum space 113. MLD 111 is mirrored in this quorum space of multiple physical drives and so can be accessed even if a drive fails. In a-particular example, at least one physical drive is associated with each LDAD 103a, 103b includes a copy of MLD 111 (designated a "quorum drive"). SAN management appliance 109 may wish to associate information such as name strings for LDADs 103a, 103b and LUNs 112a, 112b, and timestamps for object birthdates. To facilitate this behavior, the management agent uses MLD 111 to store this information as metadata. MLD 111 is created implicitly upon creation of each LDAD 103a, 103b.

Quorum space 113 is used to store information including physical store ID (a unique ID for each physical drive), version control information, type (quorum/non-quorum), RSS ID (identifies to which RSS this disk belongs), RSS Offset (identifies this disk's relative position in the RSS), Storage Cell ID (identifies to which storage cell this disk belongs), PSEG size, as well as state information indicating whether the disk is a quorum disk, for example. This metadata PSEG also contains a PSEG free list for the entire physical store, probably in the form of an allocation bitmap. Additionally, quorum space 113 contains the PSEG allocation records (PSARs) for every PSEG on the physical disk. The PSAR comprises a PSAR signature, Metadata version, PSAR usage, and an indication a RSD to which this PSEG belongs.

CLSD 114 is another type of metadata container comprising logical drives that are allocated out of address space within each LDAD 103a, 103b, but that, unlike LUNs 112a, 112b, may span multiple LDADs 103a, 103b. Preferably, each LDAD 103a, 103b includes space allocated to CLSD 114. CLSD 114 holds metadata describing the logical structure of a given LDAD 103, including a primary logical disk metadata container (PLDMC) that contains an array of descriptors (called RSDMs) that describe every RStore used by each LUN 112a, 112b implemented within the LOAD 103a, 103b. The CLSD 114 implements metadata that is regularly used for tasks such as disk creation, leveling, RSS merging, RSS splitting, and regeneration. This metadata includes state information for each physical disk that indicates whether the physical disk is "Normal" (i.e., operating as expected), "Missing" (i.e., unavailable), "Merging" (i.e., a missing drive that has reappeared and must be normalized before use), "Replace" (i.e., the drive is marked for removal and data must be copied to a distributed spare), and "Regen" (i.e., the drive is unavailable and requires regeneration of its data to a distributed spare).

A logical disk directory (LDDIR) data structure in CLSD 114 is a directory of all LUNs 112a, 112b in any LDAD 103a, 103b. An entry in the LDDS comprises a universally unique ID (UUID) an RSD indicating the location of a Primary Logical Disk Metadata Container (PLDMC) for that LUN 102. The RSD is a pointer to the base RSDM or entry point for the corresponding LUN 112a, 112b. In this manner, metadata specific to a particular LUN 112a, 112b can be accessed by indexing into the LDDIR to find the base RSDM of the particular LUN 112a, 112b. The metadata within the PLDMC (e.g., mapping structures described hereinbelow) can be loaded into memory to realize the particular LUN 112a, 112b.

Hence, the storage pool depicted in FIG. 1 implements multiple forms of metadata that can be used for recovery. The CLSD 114 implements metadata that is regularly used for tasks such as disk creation, leveling, RSS merging, RSS splitting, and regeneration. The PSAR metadata held in a known location on each disk contains metadata in a more rudimentary form that is not mapped into memory, but can be accessed when needed from its known location to regenerate all metadata in the system.

Each of the devices shown in FIG. 1 may include memory, mass storage, and a degree of data processing capability sufficient to manage a network connection. The computer program devices in accordance with the present invention are implemented in the memory of the various devices shown in FIG. 1 and enabled by the data processing capability of the devices shown in FIG. 1.

In an exemplary implementation an individual LDAD 103a, 103b may correspond to from as few as four disk drives to as many as several thousand disk drives. In particular examples, a minimum of eight drives per LDAD is required to support RAID-1 within the LDAD 103a, 103b using four paired disks. LUNs 112a, 112b defined within an LDAD 103a, 103b may represent a few megabytes of storage or less, up to 2 TByte of storage or more. Hence, hundreds or thousands of LUNs 112a, 112b may be defined within a given LDAD 103a, 103b, and thus serve a large number of storage needs. In this manner a large enterprise can be served by a single storage pool 1101 providing both individual storage dedicated to each workstation in the enterprise as well as shared storage across the enterprise. Further, an enterprise may implement multiple LDADs 103a, 103b and/or multiple storage pools 1101 to provide a virtually limitless storage capability. Logically, therefore, the virtual storage system in accordance with the present description offers great flexibility in configuration and access.

Figure 2:
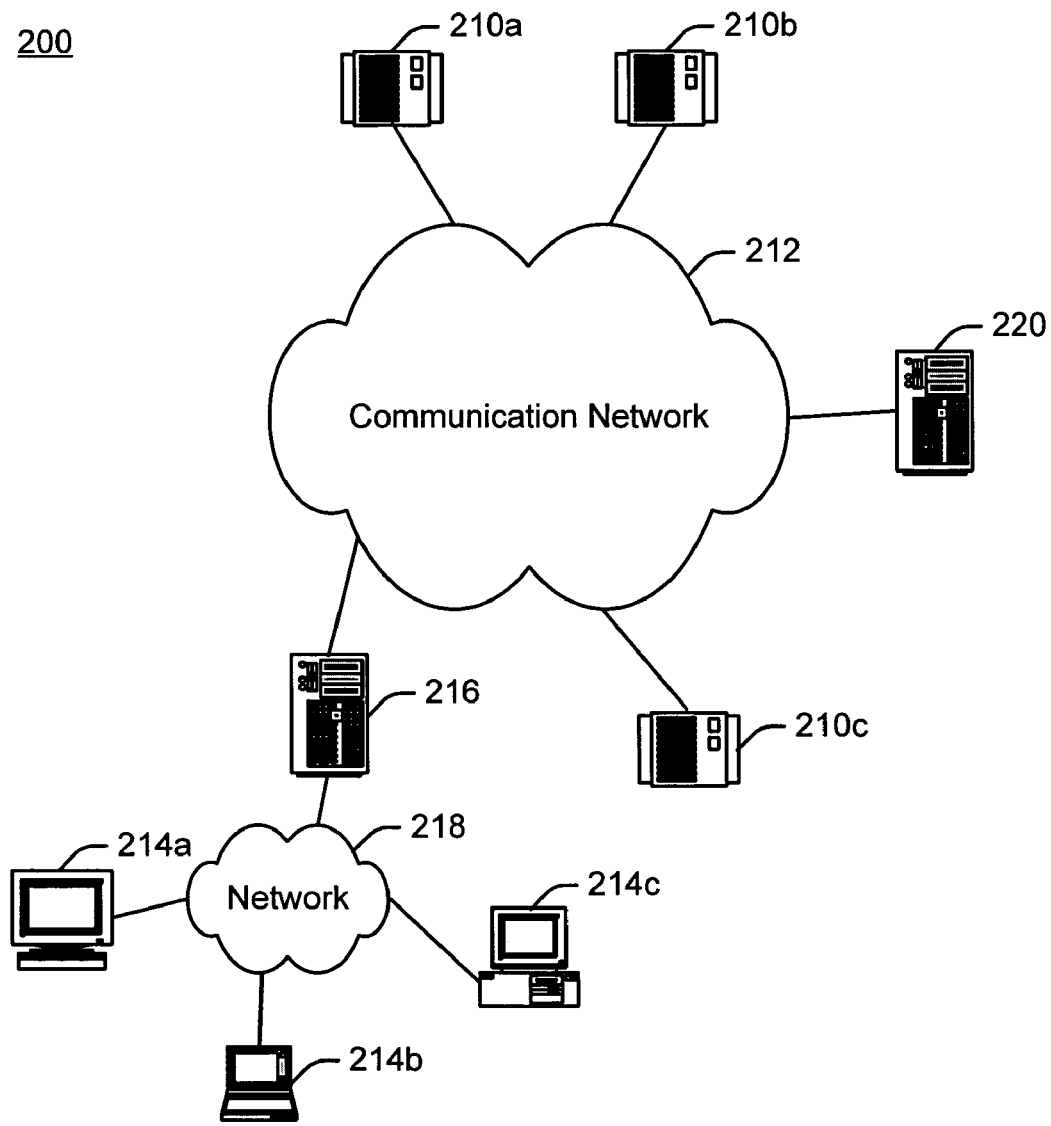
FIG. 2 is a schematic illustration of an exemplary implementation of a storage network.

FIG. 2 is a schematic illustration of an exemplary storage network 200 that may be used to implement a storage pool such as storage pool 110. Storage network 200 comprises a plurality of storage cells 210a, 210b, 210c connected by a communication network 212. Storage cells 210a, 210b, 210c may be implemented as one or more communicatively connected storage devices. Exemplary storage devices include the STORAGEWORKS line of storage devices commercially available form Hewlett-Packard Corporation of Palo Alto, Calif., USA. Communication network 212 may be implemented as a private, dedicated network such as, e.g., a Fibre Channel (FC) switching fabric. Alternatively, portions of communication network 212 may be implemented using public communication networks pursuant to a suitable communication protocol such as, e.g., the Internet Small Computer Serial Interface (iSCSI) protocol.

Client computers 214a, 214b, 214c may access storage cells 210a, 210b, 210c through a host, such as servers 216, 220. Clients 214a, 214b, 214c may be connected to file server 216 directly, or via a network 218 such as a Local Area Network (LAN) or a Wide Area Network (WAN). The number of storage cells 210a, 210b, 210c that can be included in any storage network is limited primarily by the connectivity implemented in the communication network 212. By way of example, a switching fabric comprising a single FC switch can interconnect 256 or more ports, providing a possibility of hundreds of storage cells 210a, 210b, 210c in a single storage network.

Figure 3:
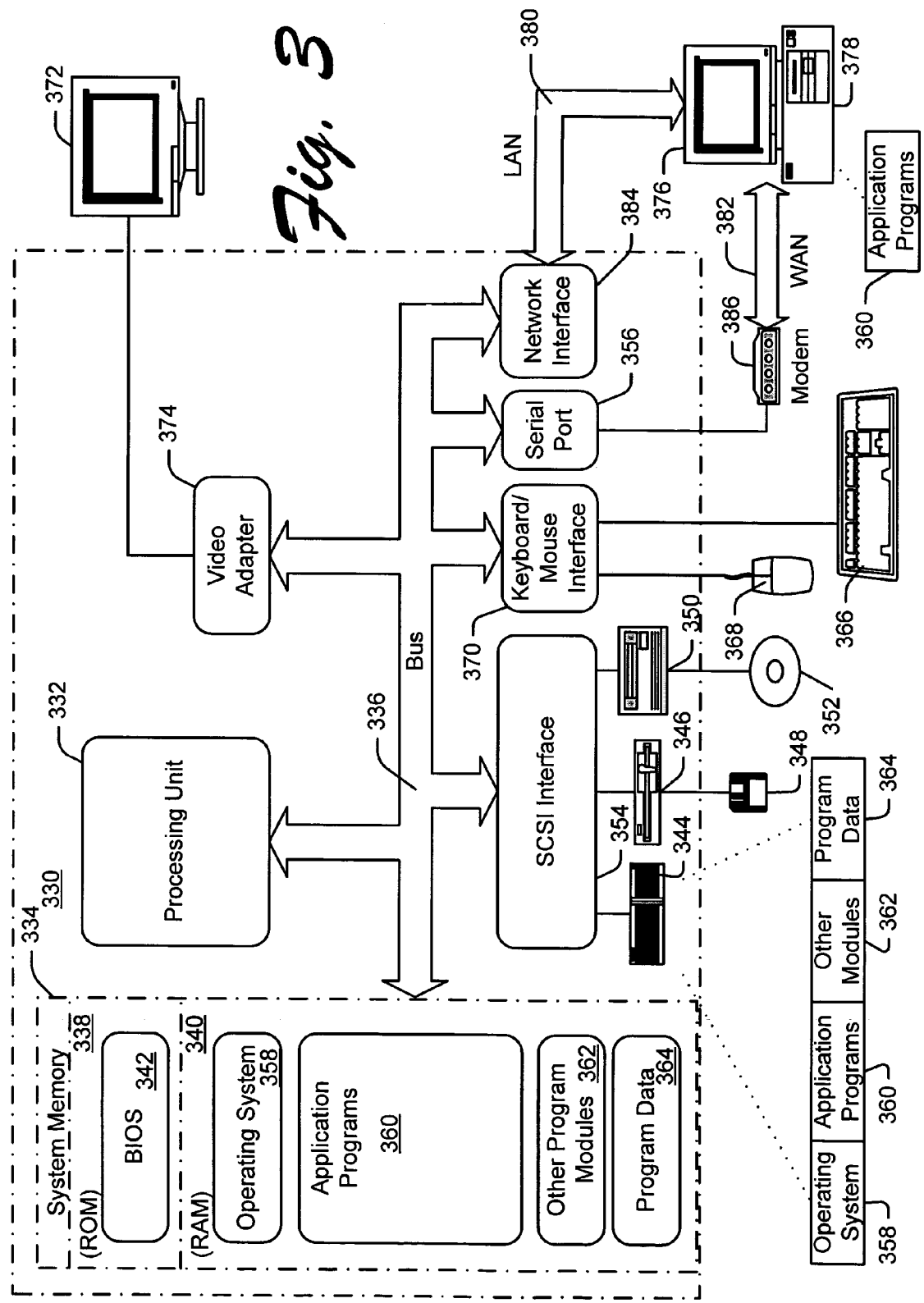
FIG. 3 is a schematic illustration of an exemplary implementation of a computing device that can be utilized to implement a host.

Hosts 216, 220 are typically implemented as server computers. FIG. 3 is a schematic illustration of an exemplary computing device 330 that can be utilized to implement a host. Computing device 330 includes one or more processors or processing units 332, a system memory 334, and a bus 336 that couples various system components including the system memory 334 to processors 332. The bus 336 represents one or more of any of several types of bus structures, including a memory bus or memory controller, a peripheral bus, an accelerated graphics port, and a processor or local bus using any of a variety of bus architectures. The system memory 334 includes read only memory (ROM) 338 and random access memory (RAM) 340. A basic input/output system (BIOS) 342, containing the basic routines that help to transfer information between elements within computing device 330, such as during start-up, is stored in ROM 338.

Computing device 330 further includes a hard disk drive 344 for reading from and writing to a hard disk (not shown), and may include a magnetic disk drive 346 for reading from and writing to a removable magnetic disk 348, and an optical disk drive 350 for reading from or writing to a removable optical disk 352 such as a CD ROM or other optical media. The hard disk drive 344, magnetic disk drive 346, and optical disk drive 350 are connected to the bus 336 by a SCSI interface 354 or some other appropriate interface. The drives and their associated computer-readable media provide nonvolatile storage of computer-readable instructions, data structures, program modules and other data for computing device 330. Although the exemplary environment described herein employs a hard disk, a removable magnetic disk 348 and a removable optical disk 352, other types of computer-readable media such as magnetic cassettes, flash memory cards, digital video disks, random access memories (RAMs), read only memories (ROMs), and the like, may also be used in the exemplary operating environment.

A number of program modules may be stored on the hard disk 344, magnetic disk 348, optical disk 352, ROM 338, or RAM 340, including an operating system 358, one or more application programs 360, other program modules 362, and program data 364. A user may enter commands and information into computing device 330 through input devices such as a keyboard 366 and a pointing device 368. Other input devices (not shown) may include a microphone, joystick, game pad, satellite dish, scanner, or the like. These and other input devices are connected to the processing unit 332 through an interface 370 that is coupled to the bus 336. A monitor 372 or other type of display device is also connected to the bus 336 via an interface, such as a video adapter 374.

Computing device 330 may operate in a networked environment using logical connections to one or more remote computers, such as a remote computer 376. The remote computer 376 may be a personal computer, a server, a router, a network PC, a peer device or other common network node, and typically includes many or all of the elements described above relative to computing device 330, although only a memory storage device 378 has been illustrated in FIG. 3. The logical connections depicted in FIG. 3 include a LAN 380 and a WAN 382.

When used in a LAN networking environment, computing device 330 is connected to the local network 380 through a network interface or adapter 384. When used in a WAN networking environment, computing device 330 typically includes a modem 386 or other means for establishing communications over the wide area network 382, such as the Internet. The modem 386, which may be internal or external, is connected to the bus 336 via a serial port interface 356. In a networked environment, program modules depicted relative to the computing device 330, or portions thereof, may be stored in the remote memory storage device. It will be appreciated that the network connections shown are exemplary and other means of establishing a communications link between the computers may be used.

Hosts 216, 220 may include host adapter hardware and software to enable a connection to communication network 212. The connection to communication network 212 may be through an optical coupling or more conventional conductive cabling depending on the bandwidth requirements. A host adapter may be implemented as a plug-in card on computing device 330. Hosts 216, 220 may implement any number of host adapters to provide as many connections to communication network 212 as the hardware and software support.

Generally, the data processors of computing device 330 are programmed by means of instructions stored at different times in the various computer-readable storage media of the computer. Programs and operating systems may distributed, for example, on floppy disks, CD-ROMs, or electronically, and are installed or loaded into the secondary memory of a computer. At execution, the programs are loaded at least partially into the computer's primary electronic memory.

Figure 4:
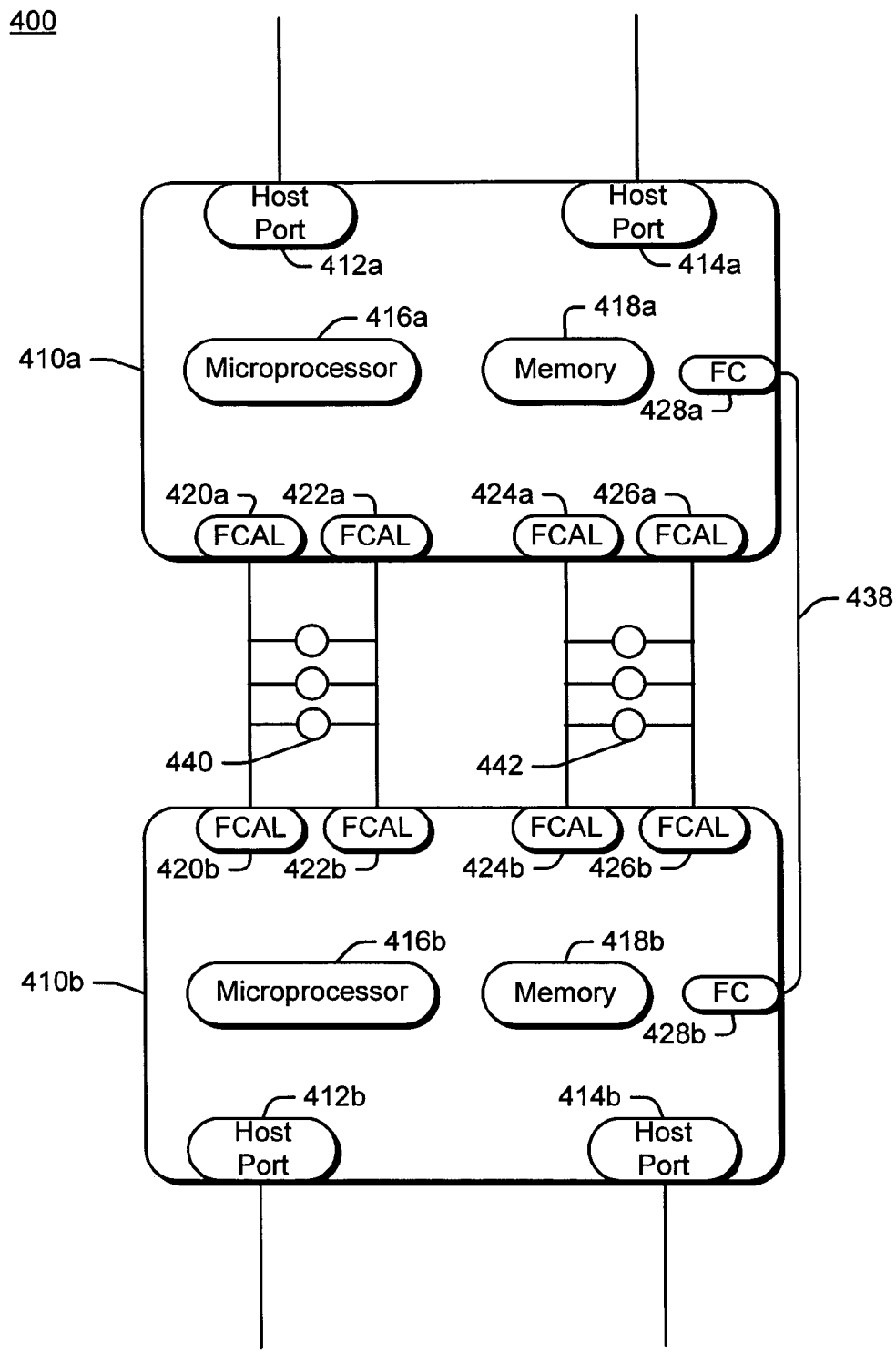
FIG. 4 is a schematic illustration of an exemplary implementation of a storage cell.

FIG. 4 is a schematic illustration of an exemplary implementation of a storage cell 400 that may be used to implement a storage cell such as 210a, 210b, or 210c. Referring to FIG. 4, storage cell 400 includes two Network Storage Controllers (NSCs), also referred to as disk array controllers, 410a, 410b to manage the operations and the transfer of data to and from one or more disk drives 440, 442. NSCs 410a, 410b may be implemented as plug-in cards having a microprocessor 416a, 416b, and memory 418a, 418b. Each NSC 410a, 410b includes dual host adapter ports 412a, 414a, 412b, 414b that provide an interface to a host, i.e., through a communication network such as a switching fabric. In a Fibre Channel implementation, host adapter ports 412a, 412b, 414a, 414b may be implemented as FC N_Ports. Each host adapter port 412a, 412b, 414a, 414b manages the login and interface with a switching fabric, and is assigned a fabric-unique port ID in the login process. The architecture illustrated in FIG. 4 provides a fully-redundant storage cell; only a single NSC is required to implement a storage cell.

Each NSC 410a, 410b further includes a communication port 428a, 428b that enables a communication connection 438 between the NSCs 410a, 410b. The communication connection 438 may be implemented as a FC point-to-point connection, or pursuant to any other suitable communication protocol.

In an exemplary implementation, NSCs 410a, 410b further include a plurality of Fiber Channel Arbitrated Loop (FCAL) ports 420a-426a, 420b-426b that implement an FCAL communication connection with a plurality of storage devices, e.g., arrays of disk drives 440, 442. While the illustrated embodiment implement FCAL connections with the arrays of disk drives 440, 442, it will be understood that the communication connection with arrays of disk drives 440, 442 may be implemented using other communication protocols. For example, rather than an FCAL configuration, a FC switching fabric or a small computer serial interface (SCSI) connection may be used.

In operation, the storage capacity provided by the arrays of disk drives 440, 442 may be added to the storage pool 110. When an application requires storage capacity, logic instructions on a host computer 128 establish a LUN from storage capacity available on the arrays of disk drives 440, 442 available in one or more storage sites. It will be appreciated that, because a LUN is a logical unit, not necessarily a physical unit, the physical storage space that constitutes the LUN may be distributed across multiple storage cells. Data for the application is stored on one or more LUNs in the storage network. An application that needs to access the data queries a host computer, which retrieves the data from the LUN and forwards the data to the application.

One or more of the storage cells 210a, 210b, 210c in the storage network 200 may implement RAID-based storage. RAID (Redundant Array of Independent Disks) storage systems are disk array systems in which part of the physical storage capacity is used to store redundant data. RAID systems are typically characterized as one of six architectures, enumerated under the acronym RAID. A RAID 0 architecture is a disk array system that is configured without any redundancy. Since this architecture is really not a redundant architecture, RAID 0 is often omitted from a discussion of RAID systems.

A RAID 1 architecture involves storage disks configured according to mirror redundancy. Original data is stored on one set of disks and a duplicate copy of the data is kept on separate disks. The RAID 2 through RAID 5 architectures all involve parity-type redundant storage. Of particular interest, a RAID 5 system distributes data and parity information across a plurality of the disks. Typically, the disks are divided into equally sized address areas referred to as "blocks". A set of blocks from each disk that have the same unit address ranges are referred to as "stripes". In RAID 5, each stripe has N blocks of data and one parity block, which contains redundant information for the data in the N blocks.

In RAID 5, the parity block is cycled across different disks from stripe-to-stripe. For example, in a RAID 5 system having five disks, the parity block for the first stripe might be on the fifth disk; the parity block for the second stripe might be on the fourth disk; the parity block for the third stripe might be on-the third disk; and so on. The parity-block for succeeding stripes typically "precesses" around the disk drives in a helical pattern (although other patterns are possible). RAID 2 through RAID 4 architectures differ from RAID 5 in how they compute and place the parity block on the disks. The particular RAID class implemented is not important.

Figure 5:
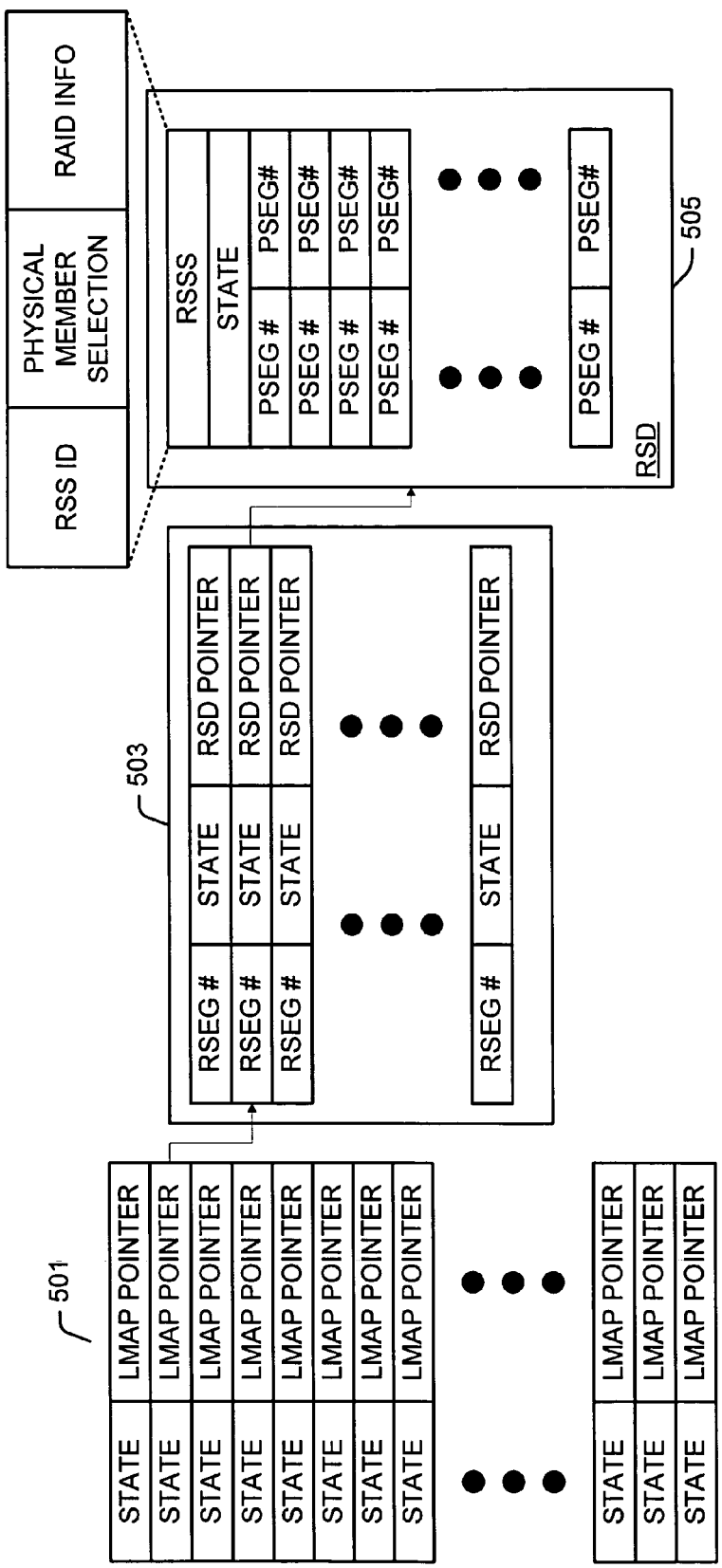
FIG. 5 illustrates an exemplary memory representation of a LUN.

FIG. 5 illustrates an exemplary memory representation of a LUN 112a, 112b in one exemplary implementation. A memory representation is essentially a mapping structure that is implemented in memory of a NSC 410a, 410b that enables translation of a request expressed in terms of a logical block address (LBA) from host such as host 128 depicted in FIG. 1 into a read/write command addressed to a particular portion of a physical disk drive such as disk drive 440, 442. A memory representation desirably is small enough to fit into a reasonable amount of memory so that it can be readily accessed in operation with minimal or no requirement to page the memory representation into and out of the NSC's memory.

The memory representation described herein enables each LUN 112a, 112b to implement from 1 Mbyte to 2 TByte in storage capacity. Larger storage capacities per LUN 112a, 112b are contemplated. For purposes of illustration a 2 Terabyte maximum is used in this description. Further, the memory representation enables each LUN 112a, 112b to be defined with any type of RAID data protection, including multi-level RAID protection, as well as supporting no redundancy at all. Moreover, multiple types of RAID data protection may be implemented within a single LUN 112a, 112b such that a first range of logical disk addresses (LDAs) correspond to unprotected data, and a second set of LDAs within the same LUN 112a, 112b implement RAID 5 protection. Hence, the data structures implementing the memory representation must be flexible to handle this variety, yet efficient such that LUNs 112a, 112b do not require excessive data structures.

A persistent copy of the memory representation shown in FIG. 5 is maintained in the PLDMDC for each LUN 112a, 112b described hereinbefore. The memory representation of a particular LUN 112a, 112b is realized when the system reads metadata contained in the quorum space 113 to obtain a pointer to the corresponding PLDMDC, then retrieves the PLDMDC and loads an level 2 map (L2MAP) 501. This is performed for every LUN 112a, 112b, although in ordinary operation this would occur once when a LUN 112a, 112b was created, after which the memory representation will live in memory as it is used.

A logical disk mapping layer maps a LDA specified in a request to a specific RStore as well as an offset within the RStore. Referring to the embodiment shown in FIG. 5, a LUN may be implemented using an L2MAP 501, an LMAP 503, and a redundancy set descriptor (RSD) 505 as the primary structures for mapping a logical disk address to physical storage location(s) represented by an address. The mapping structures shown in FIG. 5 are implemented for each LUN 112a, 112b. A single L2MAP handles the entire LUN 112a, 112b. Each LUN 112a, 112b is represented by multiple LMAPs 503 where the particular number of LMAPs 503 depend on the actual address space that is allocated at any given time. RSDs 505 also exist only for allocated storage space. Using this split directory approach, a large storage volume that is sparsely populated with allocated storage, the structure shown in FIG. 5 efficiently represents the allocated storage while minimizing data structures for unallocated storage.

L2MAP 501 includes a plurality of entries where each entry represents 2 Gbyte of address space. For a 2 Tbyte LUN 112a, 112b, therefore, L2MAP 501 includes 1024 entries to cover the entire address space in the particular example. Each entry may include state information corresponding to the corresponding 2 Gbyte of storage, and a pointer a corresponding LMAP descriptor 503. The state information and pointer are only valid when the corresponding 2 Gbyte of address space have been allocated, hence, some entries in L2MAP 501 will be empty or invalid in many applications.

The address range represented by each entry in LMAP 503, is referred to as the logical disk address allocation unit (LDAAU). In the particular implementation, the LDAAU is 1 MByte. An entry is created in LMAP 503 for each allocated LDAAU irrespective of the actual utilization of storage within the LDAAU. In other words, a LUN 102 can grow or shrink in size in increments of 1 Mbyte. The LDAAU is represents the granularity with which address space within a LUN 112a, 112b can be allocated to a particular storage task.

An LMAP 503 exists only for each 2 Gbyte increment of allocated address space. If less than 2 Gbyte of storage are used in a particular LUN 112a, 112b, only one LMAP 503 is-required, whereas, if 2 Tbyte of storage is used, 1024 LMAPs 503 will exist. Each LMAP 503 includes a plurality of entries where each entry optionally corresponds to a redundancy segment (RSEG). An RSEG is an atomic logical unit that is roughly analogous to a PSEG in the physical domain—akin to a logical disk partition of an RStore. In a particular embodiment, an RSEG is a logical unit of storage that spans multiple PSEGs and implements a selected type of data protection. Entire RSEGs within an RStore are bound to contiguous LDAs in a preferred implementation. In order to preserve the underlying physical disk performance for sequential transfers, it is desirable to adjacently locate all RSEGs from an RStore in order, in terms of LDA space, so as to maintain physical contiguity. If, however, physical resources become scarce, it may be necessary to spread RSEGs from RStores across disjoint areas of a LUN 102. The logical disk address specified in a request 501 selects a particular entry within LMAP 503 corresponding to a particular RSEG that in turn corresponds to 1 Mbyte address space allocated to the particular RSEG#. Each LMAP entry also includes state information about the particular RSEG, and an RSD pointer.

Optionally, the RSEG#s may be omitted, which results in the RStore itself being the smallest atomic logical unit that can be allocated. Omission of the RSEG# decreases the size of the LMAP entries and allows the memory representation of a LUN 102 to demand fewer memory resources per MByte of storage. Alternatively, the RSEG size can be increased, rather than omitting the concept of RSEGs altogether, which also decreases demand for memory resources at the expense of decreased granularity of the atomic logical unit of storage. The RSEG size in proportion to the RStore can, therefore, be changed to meet the needs of a particular application.

The RSD pointer points to a specific RSD 505 that contains metadata describing the RStore in which the corresponding RSEG exists. As shown in FIG. 5, the RSD includes a redundancy storage set selector (RSSS) that includes a redundancy storage set (RSS) identification, a physical member selection, and RAID information. The physical member selection is essentially a list of the physical drives used by the RStore. The RAID information, or more generically data protection information, describes the type of data protection, if any, that is implemented in the particular RStore. Each RSD also includes a number of fields that identify particular PSEG numbers within the drives of the physical member selection that physically implement the corresponding storage capacity. Each listed PSEG# corresponds to one of the listed members in the physical member selection list of the RSSS. Any number of PSEGs may be included, however, in a particular embodiment each RSEG is implemented with between four and eight PSEGs, dictated by the RAID type implemented by the RStore.

In operation, each request for storage access specifies a LUN 112a, 112b, and an address. A NSC such as NSC 410a, 410b maps the logical drive specified to a particular LUN 112a, 112b, then loads the L2MAP 501 for that LUN 102 into memory if it is not already present in memory. Preferably, all of the LMAPs and RSDs for the LUN 102 are loaded into memory as well. The LDA specified by the request is used to index into L2MAP 501, which in turn points to a specific one of the LMAPs. The address specified in the request is used to determine an offset into the specified LMAP such that a specific RSEG that corresponds to the request-specified address is returned. Once the RSEG# is known, the corresponding RSD is examined to identify specific PSEGs that are members of the redundancy segment, and metadata that enables a NSC 410a, 410b to generate drive specific commands to access the requested data. In this manner, an LDA is readily mapped to a set of PSEGs that must be accessed to implement a given storage request.

The L2MAP consumes 4 Kbytes per LUN 112a, 112b regardless of size in an exemplary implementation. In other words, the L2MAP includes entries covering the entire 2 Tbyte maximum address range even where only a fraction of that range is actually allocated to a LUN 112a, 112b. It is contemplated that variable size L2MAPs may be used, however such an implementation would add complexity with little savings in memory. LMAP segments consume 4 bytes per Mbyte of address space while RSDs consume 3 bytes per MB. Unlike the L2MAP, LMAP segments and RSDs exist only for allocated address space.

Figure 6:
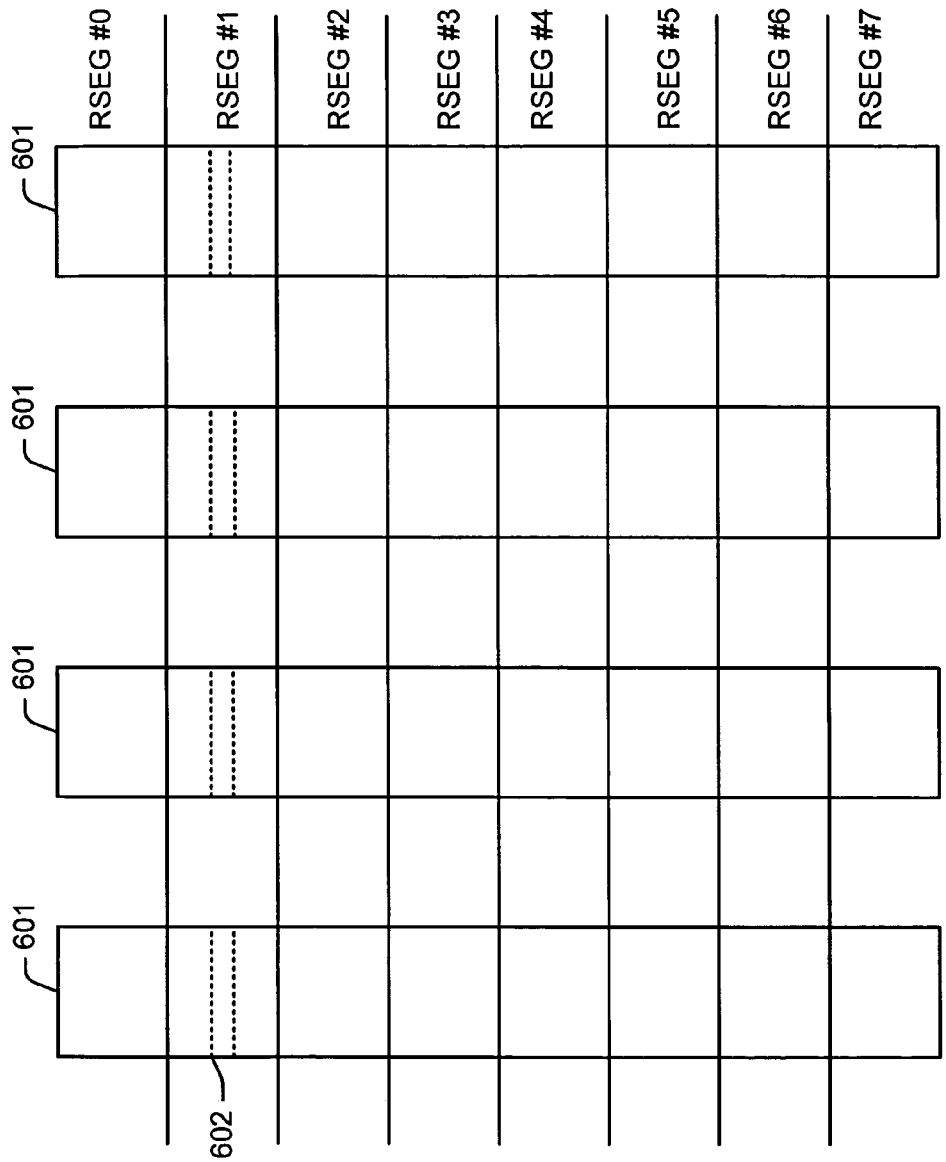
FIG. 6 is a schematic illustration of data allocation in a virtualized storage system.

FIG. 6 is a schematic illustration of data allocation in a virtualized storage system. Referring to FIG. 6, a redundancy layer selects PSEGs 601 based on the desired protection and subject to NSC data organization rules, and assembles them to create Redundant Stores (RStores). The set of PSEGs that correspond to a particular redundant storage set are referred to as an "RStore". Data protection rules may require that the PSEGs within an RStore are located on separate disk drives, or within separate enclosure, or at different geographic locations. Basic RAID-5 rules, for example, assume that striped data involve striping across independent drives. However, since each drive comprises multiple PSEGs, the redundancy layer of the present invention ensures that the PSEGs are selected from drives that satisfy desired data protection criteria, as well as data availability and performance criteria.

RStores are allocated in their entirety to a specific LUN 102. RStores may be partitioned into 1 Mbyte segments (RSEGs) as shown in FIG. 6. Each RSEG in FIG. 6 presents only 80% of the physical disk capacity consumed as a result of storing a chunk of parity data in accordance with RAID 5 rules. When configured as a RAID 5 storage set, each RStore will comprise data on four PSEGs, and parity information on a fifth PSEG (not shown) similar to RAID4 storage. The fifth PSEG does not contribute to the overall storage capacity of the RStore, which appears to have four PSEGs from a capacity standpoint. Across multiple RStores the parity will fall on various of various drives so that RAID 5 protection is provided.

RStores are essentially a fixed quantity (8 MByte in the examples) of virtual address space. RStores consume from four to eight PSEGs in their entirety depending on the data protection level. A striped RStore without redundancy consumes 4 PSEGs (4-2048 KByte PSEGs=8 MB), an RStore with 4+1 parity consumes 5 PSEGs and a mirrored RStore consumes eight PSEGs to implement the 8 Mbyte of virtual address space.

An RStore is analogous to a RAID disk set, differing in that it comprises PSEGs rather than physical disks. An RStore is smaller than conventional RAID storage volumes, and so a given LUN 102 will comprise multiple RStores as opposed to a single RAID storage volume in conventional systems.

It is contemplated that drives 405 may be added and removed from an LDAD 103 over time. Adding drives means existing data can be spread out over more drives while removing drives means that existing data must be migrated from the exiting drive to fill capacity on the remaining drives. This migration of data is referred to generally as "leveling". Leveling attempts to spread data for a given LUN 102 over as many physical drives as possible. The basic purpose of leveling is to distribute the physical allocation of storage represented by each LUN 102 such that the usage for a given logical disk on a given physical disk is proportional to the contribution of that physical volume to the total amount of physical storage available for allocation to a given logical disk.

Existing RStores can be modified to use the new PSEGs by copying data from one PSEG to another and then changing the data in the appropriate RSD to indicate the new membership. Subsequent RStores that are created in the RSS will use the new members automatically. Similarly, PSEGs can be removed by copying data from populated PSEGs to empty PSEGs and changing the data in LMAP 502 to reflect the new PSEG constituents of the RSD. In this manner, the relationship between physical storage and logical presentation of the storage can be continuously managed and updated to reflect current storage environment in a manner that is invisible to users.

Snapdifference Files

In one aspect, the system is configured to implement files referred to herein as snapdifference files or snapdifference objects. Snapdifference files are entities designed to combine certain characteristics of snapshots (i.e., capacity efficiency by sharing data with a successor and predecessor files when there has been no change to the data during the life of the snapdifference) with time characteristics of log files. Snapdifference files may also be used in combination with a base snapclone and other snapdifferences to provide the ability to view different copies of data through time. Snapdifference files also capture all new data targeted at a LUN starting at a point in time, until it is decided to deactivate the snapdifference, and start a new one Snapdifference files may be structured similar to snapshots. Snapdifference may use metadata structures similar to the metadata structures used in snapshots to enable snapshot files to share data with a predecessor LUN when appropriate, but to contain unique or different data when the time of data arrival occurs during the active period of a snapdifference. A successor snapdifference can reference data in a predecessor snapdifference or predecessor LUN via the same mechanism.

By way of example, assume LUN A is active until 1:00 pm Sep. 12, 2004. Snapdifference 1 of LUN A is active from 1:00 pm+until 2:00 pm Sep. 12, 2004. Snapdifference 2 of LUN A is active from 2:00 pm+until 3:00 pm Sep. 12, 2004. Data in each of LUN A, Snapdifference 1 and Snapdifference 2 may be accessed using the same virtual metadata indexing methods. Snapdifference 1 contains unique data that has changed (at the granularity of the indexing scheme used) from after 1:00 pm to 2:00 pm and shares all other data with LUN A. Snapdifference 2 contains unique data that has changed from after 2:00 pm to 3:00 pm and shares all other data with either snapdifference 1 or LUN A. This data is accessed using the above mentioned indexing, sharing bit scheme referred to as a snap tree. So changes over time are maintained—LUN A view of data prior to 1:00 pm, Snapdifference 1 and LUN A view of data prior to 2:00 pm and earlier, Snapdifference 2 and Snapdifference 1 and LUN A—view of data 3:00 pm and earlier. Alternatively, segmented time views Snapdifference 1 view of data from 1:00 pm to 2:00 pm, or Snapdifference 2 view of data from 2:00 pm to 3:00 pm.

Hence, snapdifferences share similarities with log files in that snapdifference files associate data with time (i.e., they collect new data from time a to time b), while being structurally to a snapshot, (i.e., they have characteristics of a snapshot, namely speed of data access and space efficiency along with the ability to maintain changes over time).

By combining key snapshot characteristics and structure with a the log file time model snapdifferences may be used to provide an always in synch mirroring capability, time maintenance for data, straightforward space efficient incremental backup and powerful instant recovery mechanisms.

Figure 7:
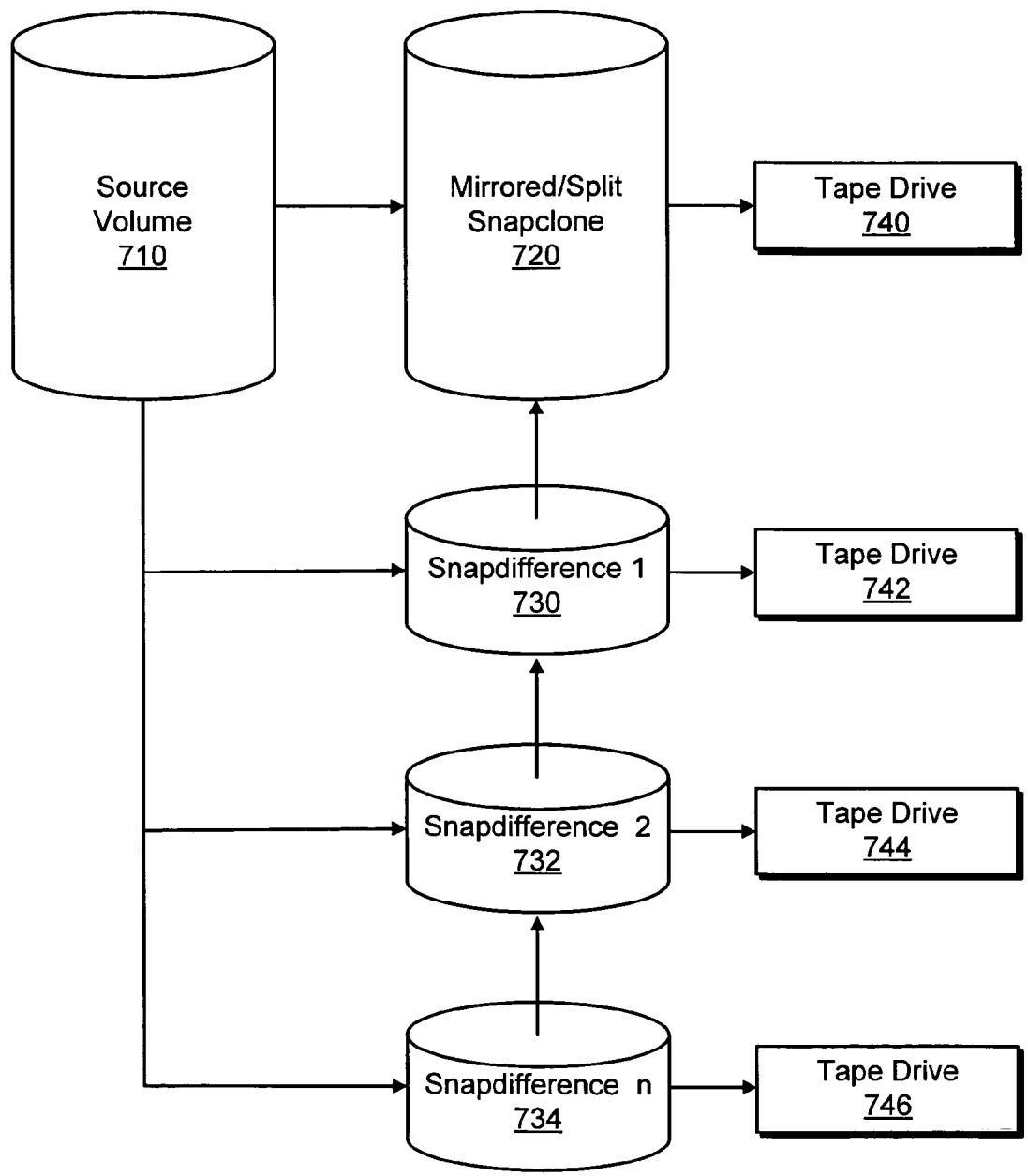
FIG. 7 is schematic illustration of an exemplary data architecture for implementing snapdifference files in a storage network.

FIG. 7 is a schematic high-level illustration of a storage data architecture incorporating snapdifference files. Referring to FIG. 7, a source volume 710 is copied to a snapclone 720, which may be a prenormalized snapclone or a postnormalized snapclone.

As used herein, the term prenormalized snapclone refers to a snapclone that synchronizes with the source volume 710 before the snapclone is split from the source volume 710. A prenormalized snapclone represents a point-in-time copy of the source volume at the moment the snapclone is split from the source volume. By contrast, a postnormalized snapclone is created at a specific point in time, but a complete, separate copy of the data in the source volume 710 is not completed until a later point in time.

A snapdifference file is created and activated at a particular point in time, and subsequently all I/O operations that affect data in the source volume 710 are copied contemporaneously to the active snapdifference file. At a desired point in time or when a particular threshold is reached (e.g., when a snapdifference file reaches a predetermined size), the snapdifference file may be closed and another snapdifference file may be activated. After a snapdifference file 730, 732, 734 has been inactivated it may be merged into the snapclone 720. In addition, snapdifference files may be backed up to a tape drive such as tape drive 742, 744, 746.

In one implementation, a snapdifference file is created and activated contemporaneous with the creation of a snapclone such as snapclone 720. I/O operations directed to source volume 710 are copied to the active snapdifference file, such as snapdifference file 730.

Figure 8:
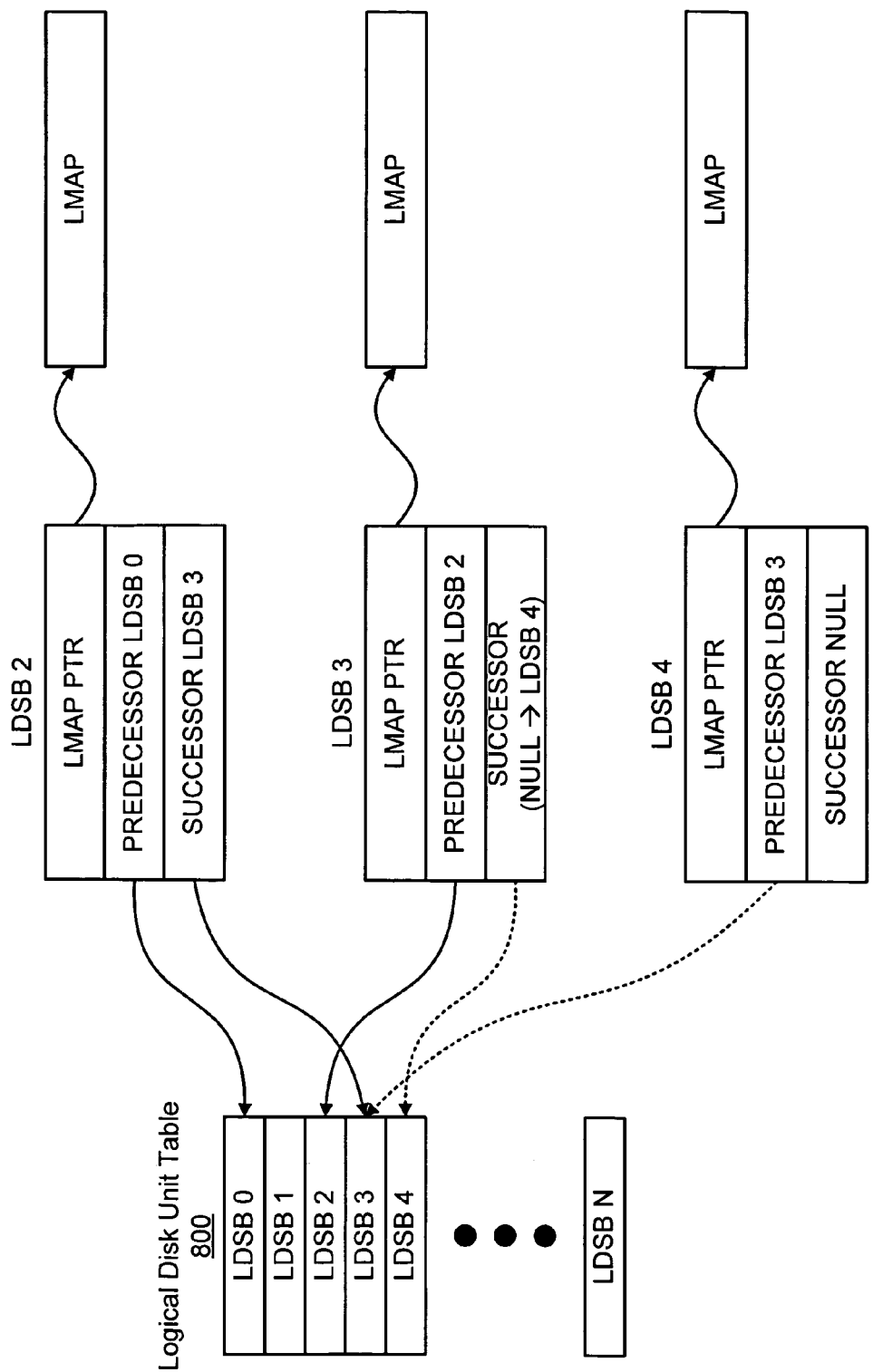
FIG. 8 is a schematic illustration of an exemplary file structure for creating and using snapdifference files in a storage network.
Figure 9A:
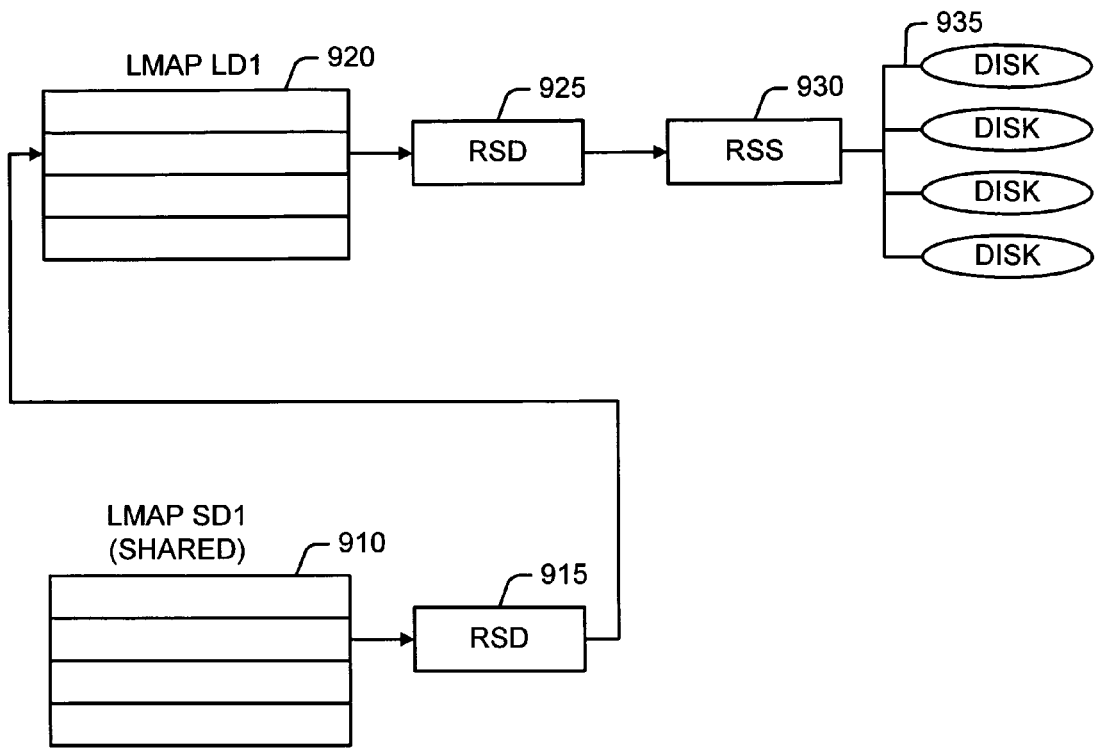
FIGS. 9a-9b are schematic illustrations of memory maps for snapdifference files.
Figure 9B:
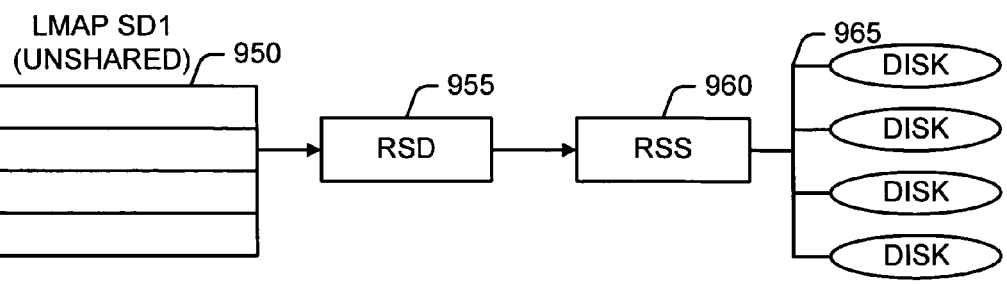

Snapdifference files will be explained in greater detail with reference to FIG. 8, FIGS. 9a-9b, and FIGS. 10-13. FIG. 8 and FIGS. 9a-9b are schematic illustrations of memory maps for snapdifference files. Referring briefly to FIG. 8, in one implementation a memory mapping for snapdifference files begins in a logical disk unit table 800, which is an array of data structures that maps a plurality of logical disk state blocks (LDSBs), which may be numbered sequentially, i.e., LDSB0, LDSB1 ... LDSB N. Each LDSB includes a pointer to an LMAP, pointers to the predecessor and successor LDSB. The LMAP pointer points to an LMAP mapping data structure, which, as described above, ultimately maps to a PSEG (or to a disk in a non-virtualized system). The predecessor and successor LDSB fields are used to track the base snapclone and its related snapdifferences. The base snapclone is represented by the LDSB that has no predecessor, and the active snapdifference is represented by the LDSB that has no successor.

FIG. 9a illustrates a memory mapping for a snapdifference file in which the sharing bits of the RSD are set. Hence, the LMAP 910 structure which represents a snapdifference maps an RSD 915, which in turn map to a predecessor snapdifference or a base snapclone represented by LMAP 920 of a different data structure. This indicates that LMAP 910 is a successor of LMAP 920 and shares its data with LMAP 920. The LMAP 920 maps to an RSD 925, which in turn maps to an RSS 930, which maps to physical disk space 935 (or to PSEGs in a virtualized storage system). FIG. 9b illustrates a memory mapping for a snapdifference file in which the sharing bits of the RSD are not set, i.e., which is not shared. The LMAP 950 maps to an RSD 955, which in turn maps to an RSS 960, which maps to physical disk space 965 (or to PSEGs in a virtualized storage system).

FIGS. 10-13 are flow diagrams illustration operations in exemplary methods for creating, reading from, writing to, and merging a snapdifference, respectively. In the following description, it will be understood that each block of the flowchart illustrations, and combinations of blocks in the flowchart illustrations, can be implemented by computer program instructions. These computer program instructions may be loaded onto a computer or other programmable apparatus to produce a machine, such that the instructions that execute on a processor or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed in the computer or on other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Figure 10:
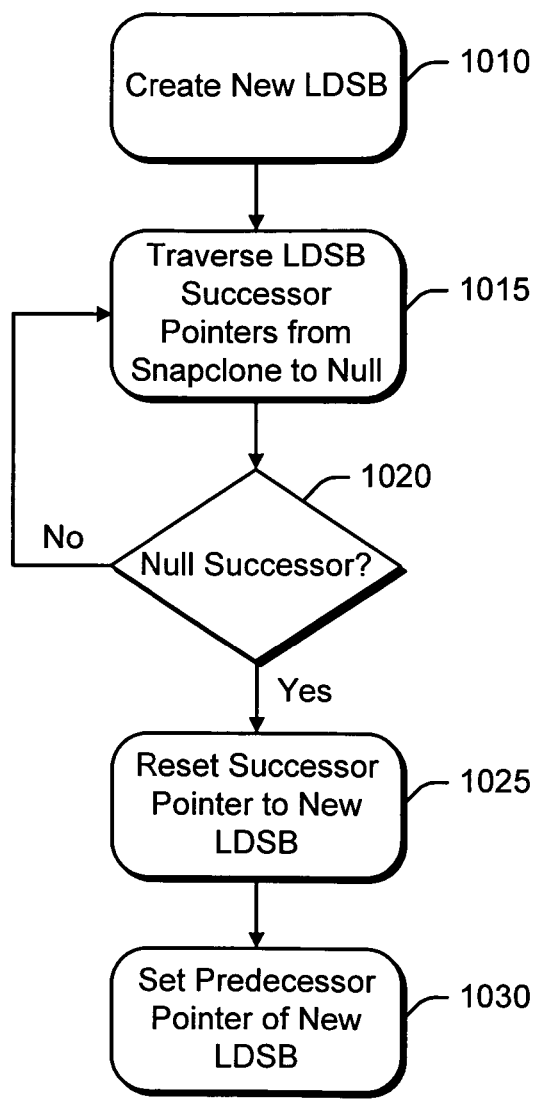
FIG. 10 is a flowchart illustrating operations in an exemplary method for creating a snapdifference file.

FIG. 10 is a flowchart illustrating operations in an exemplary method for creating a snapdifference file. The operations of FIG. 10 may be executed in a suitable processor such as, e.g., an array controller in a storage system, in response to receiving a request to create a snapdifference file. Referring to FIG. 10, at operation 1010 a new LDSB is created representing the new snapdifference. Referring again to FIG. 8, and assuming that LDSB 0 through LDSB 3 have been allocated, operation 1010 creates a new LDSB, which is numbered LDSB 4. At operations 1015-1020 the LDSB successor pointers are traversed beginning at the LDSB for the snapclone until a null successor pointer is encountered. When a null successor pointer is encountered the null pointer is reset to point to the newly created LDSB (operation 1025). Hence, in the scenario depicted in FIG. 8, the successor pointers are traversed from LDSB 0 to LDSB2, to LDSB3, which has a null successor pointer. Operation 1025 resets the successor pointer in LDSB 3 to point to LDSB4. Control then passes to operation 1030, in which the predecessor pointer of the new LDSB is set. In the scenario depicted in FIG. 8, the predecessor pointer of LDSB 4 is set to point to LDSB 3. The operations of FIG. 10 configure the high-level data map for the snapdifference file. The lower level data mapping (i.e., from the LMAP to the PSEGs or physical disk segments) may be performed in accordance with the description provided above.

Figure 11:
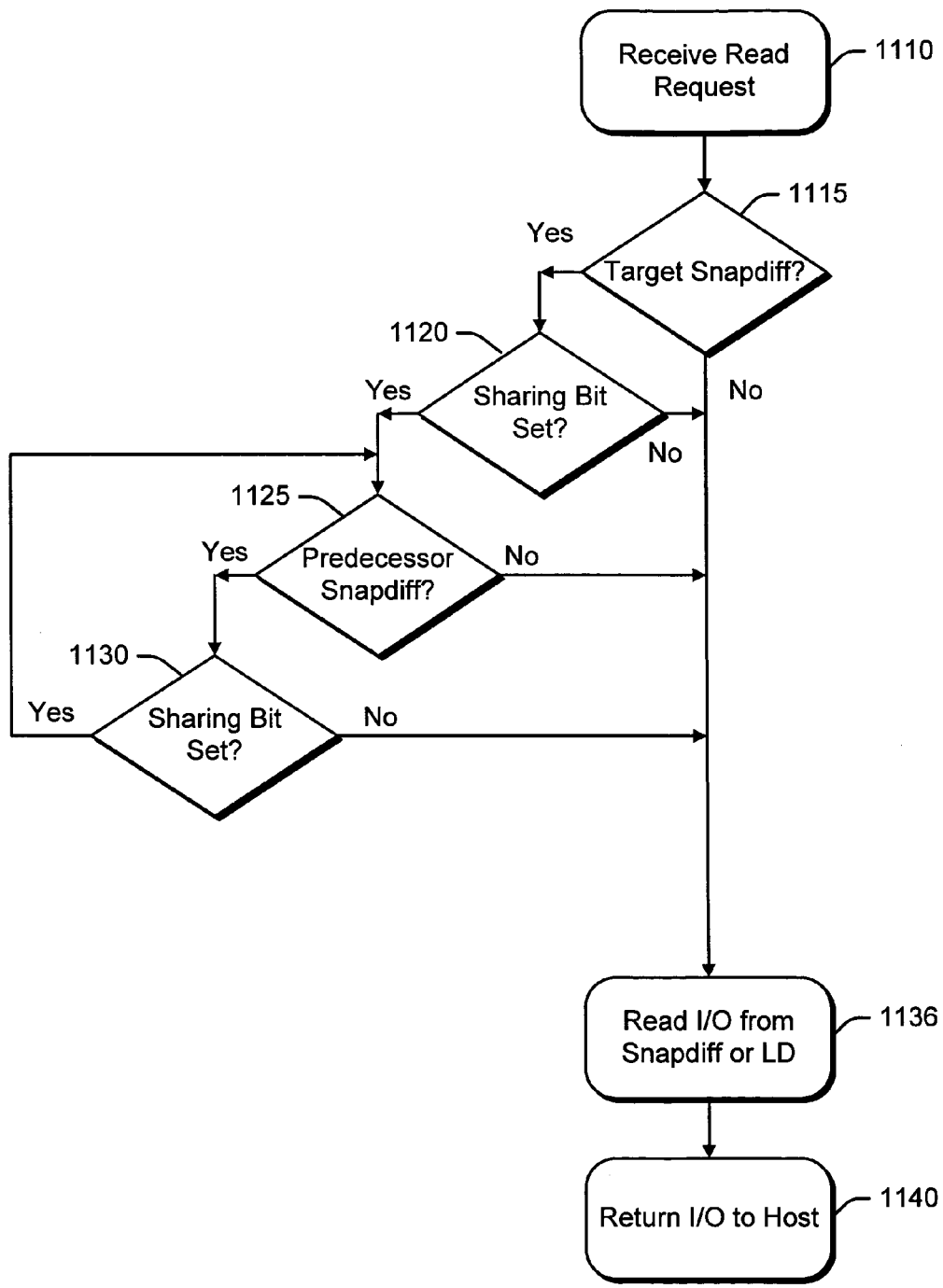
FIG. 11 is a flowchart illustrating operations in an exemplary method for performing read operations in an environment that utilizes one or more snapdifference files.

FIG. 11 is a flowchart illustrating operations in an exemplary method for performing read operations in an environment that utilizes one or more snapdifference files. Referring to FIG. 11, at operation 1110 a read request is received, e.g., at an array controller in a storage system. In an exemplary implementation the read request may be generated by a host computer and may identify a Logical Block Address (LBA) or another indicia of the address in the storage system that is to be read. At operation 1115 it is determined whether the read request is directed to a snapdifference file. In an exemplary implementation snapdifference files may be assigned specific LBAs and/or LD identifiers, which may be used to make the determination required in operation 1115.

If, at operation 1115, it is determined that the read request is not directed to a snapdifference file, then control passes to operation 1135 and the read request may be executed from the LD identified in the read request pursuant to normal -operating procedures. By contrast, if at operation 1115 it is determined that the read request is directed to a snapdifference file, then operations 1120-1130 are executed to traverse the existing snapdifference files to locate the LBA identified in the read request.

At operation 1120 the active snapdifference file is examined to determine whether the sharing bit associated with the LBA identified in the read request is set. If the sharing bit is not set, which indicates that the active snapdifference file includes new data in the identified LBA, then control passes to operation 1135 and the read request may be executed from the LBA in the snapdifference file identified in the read request.

By contrast, if at operation 1120 the sharing bit is not set, then control passes to operation 1125, where it is determined whether the active snapdifference file's predecessor is another snapdifference file. In an exemplary implementation this may be determined by analyzing the LDSB identified by the active snapdifference's predecessor pointer, as depicted in FIG. 8. If the predecessor is not a snapdifference file, then control passes to operation 1135 and the read request may be executed from the LD identified in the read request pursuant to normal operating procedures. By contrast, if at operation 1125 it is determined that the read request is directed to a snapdifference file, then operations 1125-1130 are executed to traverse the existing snapdifference files until the LBA identified in the read request is located, either in a snapdifference file or in a LD, and the LBA is read (operation 1135) and returned to the requesting host (operation 1140).

Figure 12:
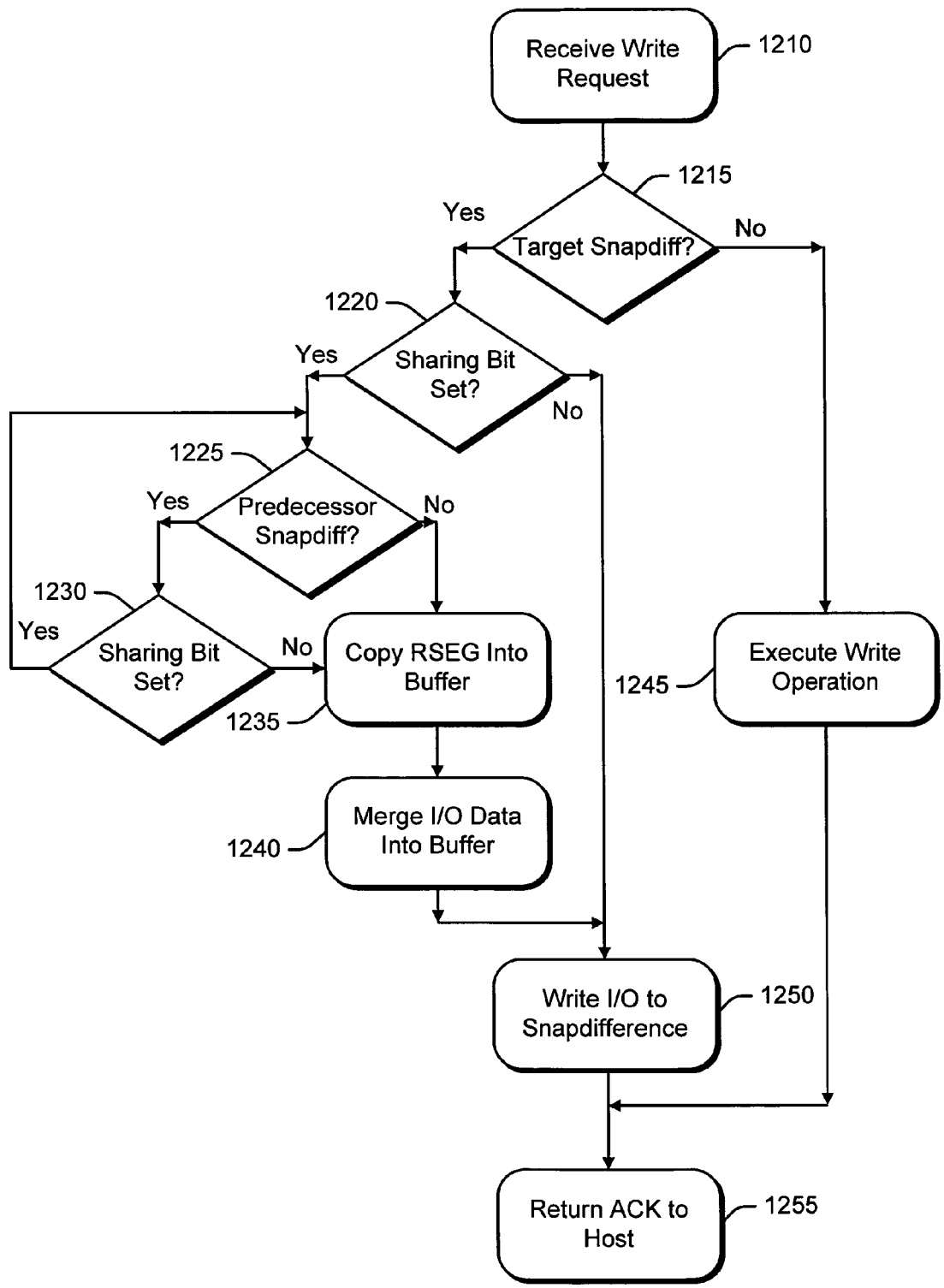
FIG. 12 is a flowchart illustrating operations in an exemplary method for performing write operations in an environment that utilizes one or more snapdifference files.

FIG. 12 is a flowchart illustrating operations in an exemplary method for performing write operations in an environment that utilizes one or more snapdifference files. Referring to FIG. 12, at operation 1210 a write request is received, e.g., at an array controller in a storage system. In an exemplary implementation the write request may be generated by a host computer and may identify a Logical Block Address (LBA) or another indicia of the address in the storage system to which the write operation is directed. At operation 1215 it is determined whether the write request is directed to a snapdifference file. In an exemplary implementation snapdifference files may be assigned specific LBAs and/or LD identifiers, which may be used to make the determination required in operation 1215.

If, at operation 1215, it is determined that the read request is not directed to a snapdifference file, then control passes to operation 1245 and the write request is executed against the LD identified in the write request pursuant to normal operating procedures, and an acknowledgment is returned to the host computer (operation 1255). By contrast, if at operation 1215 it is determined that the write request is directed to a snapdifference file, then operations 1220-1230 are executed to traverse the existing snapdifference files to locate the LBA identified in the write request.

At operation 1220 the active snapdifference file is examined to determine whether the sharing bit associated with the LBA identified in the read request is set. If the sharing bit is not set, which indicates that the active snapdifference file includes new data in the identified LBA, then control passes to operation 1250 and the write request may be executed against the LBA in the snapdifference file identified in the write request. It will be appreciated that the write operation may re-write only the LBAs changed by the write operation, or the entire RSEG(s) containing the LBAs changed by the write operation, depending upon the configuration of the system.

By contrast, if at operation 1220 the sharing bit is not set, then control passes to operation 1225, where it is determined whether the active snapdifference file's predecessor is another snapdifference file. In an exemplary implementation this may be determined by analyzing the LDSB identified by the active snapdifference's predecessor pointer, as depicted in FIG. 8. If the predecessor is not a snapdifference file, then control passes to operation 1235 and the RSEG associated with the LBA identified in the write request may be coped from the LD identified in the write request into a buffer. Control then passes to operation 1240 and the I/O data in the write request is merged into the buffer. Control then passes to operation 1250 and the I/O data is written to the active snapdifference file, and an acknowledgment is returned to the host at operation 1255.

By contrast, if at operation 1225 it is determined that the write request is directed to a snapdifference file, then operations 1225-1230 are executed to traverse the existing snapdifference files until the LBA identified in the write request is located, either in a snapdifference file or in a LD. Operations 1235-1250 are then executed to copy the RSEG changed by the write operation into the active snapdifference file.

Figure 13:
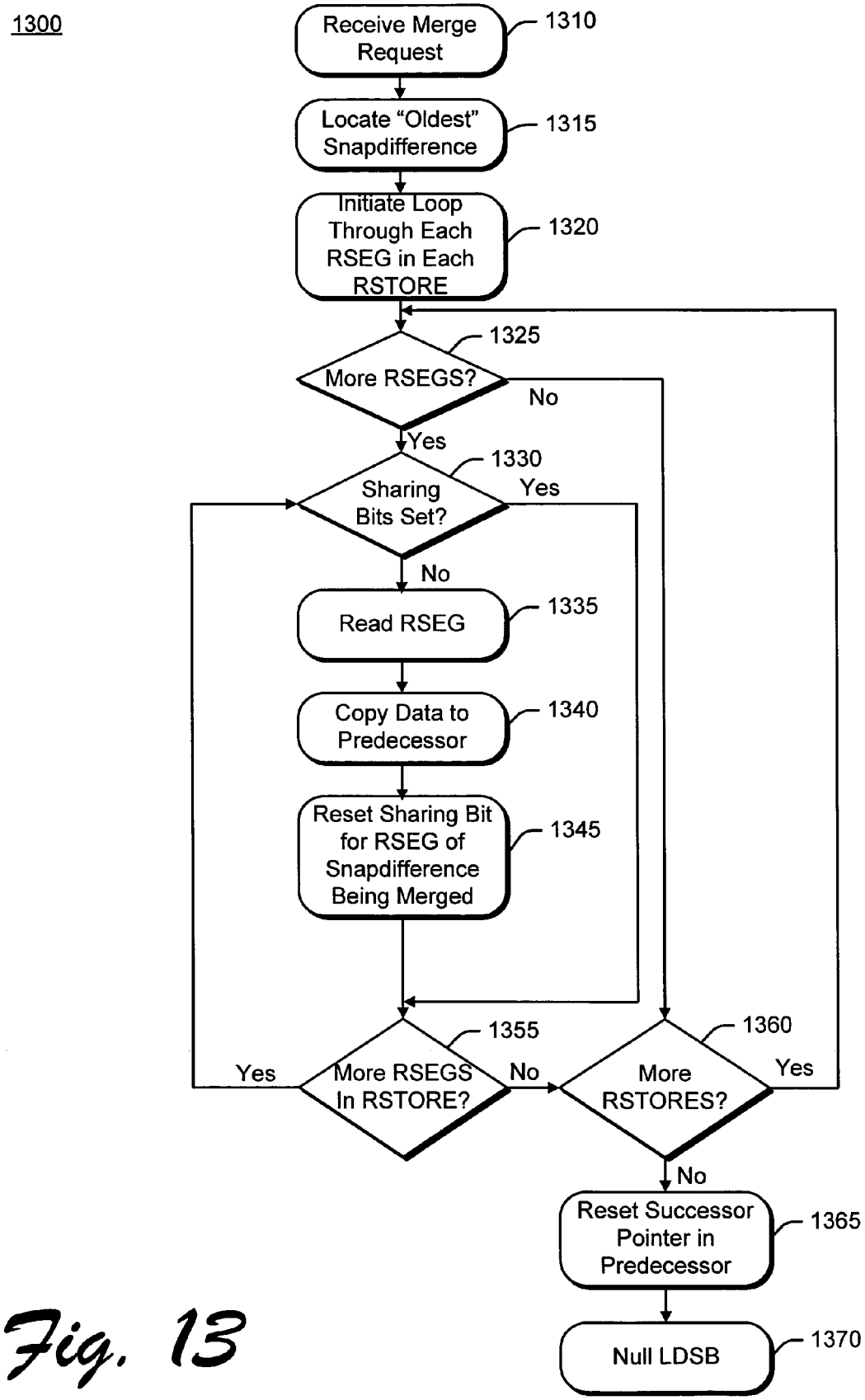
FIG. 13 is a flowchart illustrating operations in an exemplary method for merging a snapdifference file into a logical disk.

As noted above, in one implementation a snapdifference file may be time-bound, i.e., a snapdifference file may be activated at a specific point in time and may be deactivated at a specific point in time. FIG. 13 is a flowchart illustrating operations in an exemplary method for merging a snapdifference file into a logical disk such as, e.g., the snapclone with which the snapdifference is associated. The operations of FIG. 13 may be executed as a background process on a periodic basis, or may be triggered by a particular event or series of events.

The process begins at operation 1310, when a request to merge the snapdifference file is received. In an exemplary implementation the merge request may be generated by a host computer and may identify one or more snapdifference files and the snapclone into which the snapdifference file(s) are to be merged.

At operation 1315 the "oldest" snapdifference file is located. In an exemplary implementation the oldest snapdifference may be located by following the predecessor/successor pointer trail of the LDSB maps until an LDSB having a predecessor pointer that maps to the snapclone is located. Referring again to FIG. 8, and assuming that LDSB 4 is the active snapdifference file, the predecessor of LDSB 4 is LDSB 3. The predecessor of LDSB 3 is LDSB 2, and the predecessor of LDSB 2 is the LDSB 0, which is the snapclone. Accordingly, LDSB 2 represents the "oldest" snapdifference file, which is to be merged into the snapclone.

Operation 1320 initiates an iterative loop through each RSEG in each RSTORE mapped in the snapdifference file. If, at operation 1325 there are no more RSEGs in the RSTORE to analyze, then control passes to operation 1360, which determines whether there are additional RSTORES to analyze.

If at operation 1325 there are additional RSEGS in the RSTORE to analyze, then control passes to operation 1330, where it is determined whether either the successor sharing bit or the predecessor sharing bit is set for the RSEG If either of these sharing bits is set, then there is need to merge the data in the RSEG, so control passes to operation 1355.

By contrast, if at operation 1330 if the sharing bit is not set, then control passes to operation 1335 and the RSEG is read, and the data in the RSEG is copied (operation 1340) into the corresponding memory location in the predecessor, i.e., the snapclone. At operation 1345 the sharing bit is reset in the RSEG of the snapdifference being merged. If, at operation 1355, there are more RSEGs in the RSTORE to analyze, then control passes to back to operation 1330. Operations 1330-1355 are repeated until all RSEGs in the RSTORE have been analyzed, whereupon control passes to operation 1360, which determines whether there are more RSTORES to analyze. If, at operation 1360, there are more RSTORES to analyze, then control passes back to operation 1325, which restarts the loop of operations 1330 through 1355 for the selected RSTORE.

The operations of 1325 through 1360 are repeated until there are no more RSTORES to analyze in operation 1360, in which case control passes to operation 1365 and the successor pointer in the predecessor LDSB (i.e., the LDSB associated with the snapclone) is set to point to the successor of the LDSB that was merged. At operation 1370 the LDSB that was merged is set to NULL, effectively terminating the existence of the merged LDSB. This process may be repeated to successively merge the "oldest" snapdifference files into the snapclone. This also frees up the merged snapdifference LDSB for reuse.

Described herein are file structures referred to as snapdifference files, and exemplary methods for creating and using snapdifference files. In one exemplary implementation snapdifference files may be implemented in conjunction with snapclones in remote copy operations. A difference file may be created and activated contemporaneous with the generation of a snapclone. I/O operations that change the data in the source volume associated with the snapclone are recorded in the active snapdifference file. The active snapdifference file may be closed at a specific point in time or when a specific threshold associated with the snapdifference file is satisfied. Another snapdifference file may be activated contemporaneous with closing an existing snapdifference file, and the snapdifference files may be linked using pointers that indicate the temporal relationship between the snapdifference files. After a snapdifference file has been closed, the file may be merged into the snapclone with which it is associated.

Although the described arrangements and procedures have been described in language specific to structural features and/or methodological operations, it is to be understood that the subject matter defined in the appended claims is not necessarily limited to the specific features or operations described. Rather, the specific features and operations are disclosed as preferred forms of implementing the claimed present subject matter.

What is claimed is:

1. A method of computing, comprising:
   at a processor in a storage network:
   receiving a request to execute a snapclone operation;
   generating, in response to the request, a snapclone of a source disk volume;
   contemporaneous with the generation of the snapclone file, opening a first snapdifference file; and
   recording I/O operations to the source disk volume in the snapdifference file, wherein opening a first snapdifference file comprises creating a first logical memory structure which comprises:
   a first data field for a first pointer to a memory mapping data structure, wherein the memory manning structure comprises sharing bits which indicate whether data in the first snapdifference file is shared;
   a second data field for a pointer to a predecessor data structure; and
   a third data field for a pointer to a successor data structure.

2. The method of claim 1, further comprising:
   closing the first snapdifference file in response to an event;
   opening a second snapdifference file; and
   recording I/O operations to the source disk volume in the second snapdifference file.

3. The method of claim 2, wherein opening a second snapdifference file comprises:
   creating a first logical memory structure which comprises:
   a first data field for a first pointer to a memory mapping data structure, wherein the memory mapping structure comprises sharing bits which indicate whether data in the first snapdifference file is shared; and
   a second data field for a predecessor pointer to a predecessor data structure;
   a third data field for a successor pointer to a successor data structure;
   resetting a successor pointer of a predecessor data structure to point to the second snapdifference; and
   setting the predecessor pointer to point to a successor data structure.

4. The method of claim 3, further comprising:
   receiving a read request identifying one or more data blocks;
   traversing a linked list of sharing pointers to locate a snapdifference file which includes a most recent copy of the one or more data blocks identified in the read request; and
   executing the read request from the snapdifference file which includes a most recent copy of the one or more data blocks identified in the read request.

5. The method of claim 1, further comprising:
   receiving a write request identifying one or more data blocks;
   traversing a linked list of sharing pointers to locate a snapdifference file which includes a most recent copy of the one or more data blocks identified in the write request; and
   executing the write request from the snapdifference file which includes a most recent copy of the one or more data blocks identified in the write request.

6. The method of claim 1, further comprising:
receiving a merge request to merge a snapdifference file into a logical volume, wherein the merge request identifies the snapdifference file and the logical volume;
locating an oldest snapdifference file logically linked to the snapdifference file identified in the merge request; and
for each logical data block in the snapdifference file:
locating a most recent data block in a series of snapdifference files logically linked to the snapdifference file identified in the merge request; and
merging the data from the most recent data block into a corresponding data block of a predecessor data structure.

7. The method of claim 6, further comprising:
resetting a successor pointer in the logical volume; and
setting a logical disk state block associated with the snapdifference file to a null value.

8. A storage device, comprising:
a processor;
a memory module communicatively connected to the processor;
logic instructions in the memory module which, when executed by the processor, configure the processor to:
generate a snapclone copy of a source disk volume;
contemporaneous with the generation of the snapclone file, open a first snapdifference file;
record I/O operations to the source disk volume in the first snapdifference file; and
create a first logical memory structure which comprises:
a first data field for a first pointer to a memory mapping data structure, wherein the memory mapping structure comprises sharing bits which indicate whether data in the first snapdifference file is shared;
a second data field for a pointer to a predecessor data structure; and
a third data field for a pointer to a successor data structure.

9. The storage device of claim 8, further comprising logic instructions which, when executed, configure the processor to create a first logical memory structure which comprises:
a first data field for a first pointer to a memory mapping data structure, wherein the memory mapping structure comprises sharing bits which indicate whether data in the first snapdifference file is shared; and
a second data field for a predecessor pointer to a predecessor data structure;
a third data field for a successor pointer to a successor data structure;
resetting a successor pointer of a predecessor data structure to point to the second snapdifference; and
setting the predecessor pointer to point to a successor data structure.

10. The storage device of claim 8, further comprising logic instructions which, when executed, configure the processor to:
receive a read request identifying one or more data blocks;
traverse a linked list of sharing pointers to locate a snapdifference file which includes a most recent copy of the one or more data blocks identified in the read request; and
execute the read request from the snapdifference file which includes a most recent copy of the one or more data blocks identified in the read request.

11. The storage device of claim 8, further comprising logic instructions which, when executed, configure the processor to:
receive a write request identifying one or more data blocks;
traverse a linked list of sharing pointers to locate a snapdifference file which includes a most recent copy of the one or more data blocks identified in the write request; and
execute the write request from the snapdifference file which includes a most recent copy of the one or more data blocks identified in the write request.

12. The storage device of claim 8, further comprising logic instructions which, when executed, configure the processor to:
receive a merge request to merge a snapdifference file into a logical volume, wherein the merge request identifies the snapdifference file and the logical volume;
locate an oldest snapdifference file logically linked to the snapdifference file identified in the merge request; and
for each logical data block in the snapdifference file:
locate a most recent data block in a series of snapdifference files logically linked to the snapdifference file identified in the merge request; and
merge the data from the most recent data block into a corresponding data block of a predecessor data structure.

13. A data storage architecture, comprising:
a source disk volume;
a point-in-time copy of the source disk volume; and
a first snapdifference file logically linked to point-in-time copy for recording I/O operations to the source disk volume, wherein the first snapdifference file comprises:
a first data field for a first pointer to a memory mapping data structure, wherein the memory mapping structure comprises sharing bits which indicate whether data in the first snapdifference file is shared;
a second data field for a pointer to a predecessor data structure; and
a third data field for a pointer to a successor data structure.

14. The data storage architecture of claim 13, further comprising a second snapdifference file logically linked to the first snapdifference file for recording I/O operations to the source disk volume, wherein the first snapdifference file comprises:
a first data field for a first pointer to a memory mapping data structure, wherein the memory mapping structure comprises sharing bits which indicate whether data in the first snapdifference file is shared; and
a second data field for a predecessor pointer to a predecessor data structure;
a third data field for a successor pointer to a successor data structure.

15. The data storage architecture of claim 14, further comprising a storage controller comprising logic instructions stored in a computer readable medium which, when executed, configure the controller to:
receive a read request identifying one or more data blocks;
traverse a linked list of sharing pointers to locate a snapdifference file which includes a most recent copy of the one or more data blocks identified in the read request; and
execute the read request from the snapdifference file which includes a most recent copy of the one or more data blocks identified in the read request.

16. The data storage architecture of claim 13, further comprising a storage controller comprising logic instructions stored in a computer readable medium which, when executed, configure the controller to:
- receive a write request identifying one or more data blocks;
- traverse a linked list of sharing pointers to locate a snapdifference file which includes a most recent copy of the one or more data blocks identified in the write request; and
- execute the write request from the snapdifference file which includes a most recent copy of the one or more data blocks identified in the write request.

17. The data storage architecture of claim 16, further comprising a storage controller comprising logic instructions stored in a computer readable medium which, when executed, configure the controller to:
- receive a merge request to merge a snapdifference file into a logical volume, wherein the merge request identifies the snapdifference file and the logical volume;
- locate an oldest snapdifference file logically linked to the snapdifference file identified in the merge request; and
- for each logical data block in the snapdifference file:
  - locate a most recent data block in a series of snapdifference files logically linked to the snapdifference file identified in the merge request; and
  - merge the data from the most recent data block into a corresponding data block of a predecessor data structure.

* * * * *

UNITED STATES PATENT AND TRADEMARK OFFICE
CERTIFICATE OF CORRECTION

PATENT NO. : 7,305,530 B2  Page 1 of 1
APPLICATION NO. : 10/979716
DATED : December 4, 2007
INVENTOR(S) : Rodger Daniels et al.

It is certified that error appears in the above-identified patent and that said Letters Patent is hereby corrected as shown below:

In column 4, line 66, delete "LOAD" and insert -- LDAD --, therefor.

In column 18, line 20, in Claim 1, delete "manning" and insert -- mapping --, therefor.

Signed and Sealed this

Fifteenth Day of July, 2008

JON W. DUDAS
*Director of the United States Patent and Trademark Office*